April 21, 1970
H. H. MALVIN
3,507,598
DUAL COLORIMETER SYSTEM FOR SEQUENTIAL COMPARISON OF A
PLURALITY OF SAMPLES
Filed Aug. 9, 1965
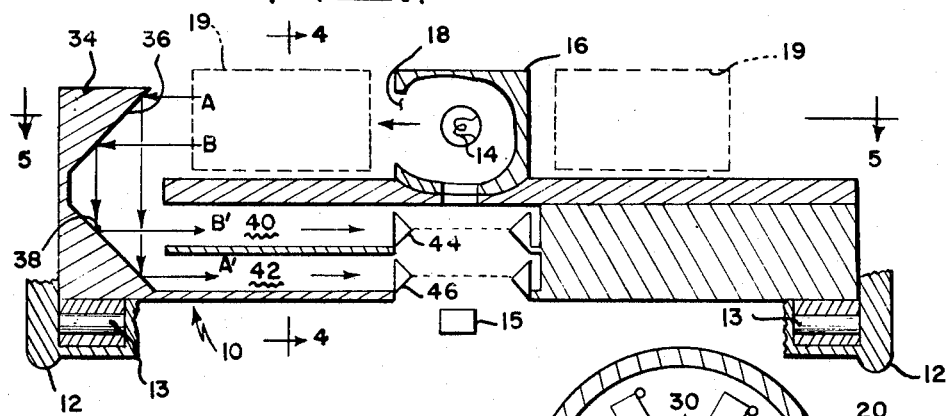
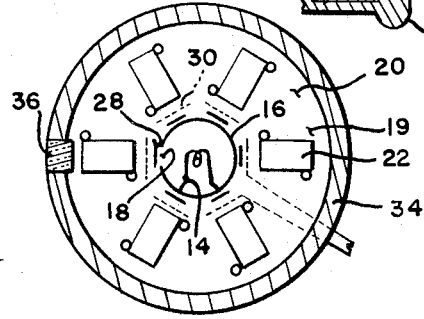
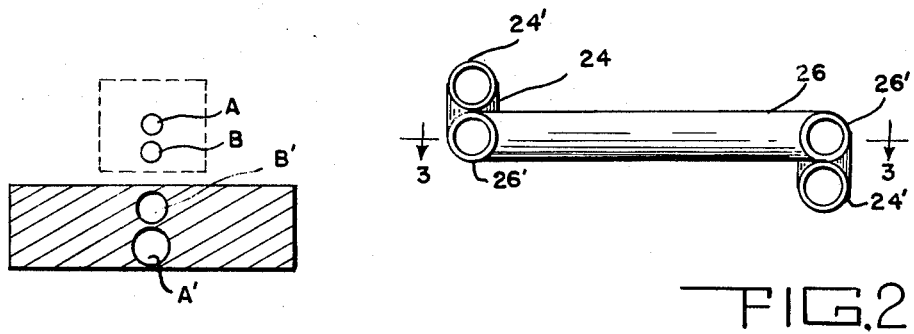
INVENTOR.
HARRY H. MALVIN
BY Harry A. Herbert Jr.
Ruth Cadier
ATTORNEYS

United States Patent Office 3,507,598
Patented Apr. 21, 1970

3,507,598
DUAL COLORIMETER SYSTEM FOR SEQUENTIAL
COMPARISON OF A PLURALITY OF SAMPLES
Harry H. Malvin, 104 Mendoza St.,
San Antonio, Tex. 78235
Filed Aug. 9, 1965, Ser. No. 478,496
Int. Cl. G01j 3/48, 3/46, 3/34
U.S. Cl. 356—185           1 Claim

ABSTRACT OF THE DISCLOSURE

Pairs of nested cuvettes are arranged in circular formation around the circumference of a circular holder. An optical system, rotatable with respect to the holder and comprising two prisms, divides light from a light source, and beams identical rays through the bases of the cuvettes of each pair and directs the rays, by means of the prism system, to individual detectors for comparison. The reflecting prisms are so placed as to redirect the pair of parallel beams in two 90° stages, the direction of the final beams being parallel to the direction of the original beams, but reversed and displaced.

---

The invention described herein may be manufactured and used by or for the United States Government for governmental purposes without payment to me of any royalty thereon.

The present invention relates to a multicuvette colorimeter for optical analysis of specimens, and more particularly, to a device which makes possible the rapid examination and analysis of a comparatively large number of specimens.

The object of the invention is the provision of a simplified and easily usable device for standardizing a beam of light, dividing it, directing one beam so formed through the specimen which is to be analyzed, and thereafter directing the two beams along parallel paths in a reverse direction to photoelectric cells or other light measuring devices for comparison.

A further object of the invention is the provision of an improved double cuvette unit wherein a pair of cuvettes are nested and so placed that an optically filtered beam directed from a single light source is divided and enters each specimen separately. One portion of the unit contains a standard and the other the unknown.

A further object of the invention is the placement of a plurality of these double cuvettes on a disk in such a way that a rotating prism system directs the divided beam above mentioned, rapidly and sequentially through each pair of cuvettes, reverses the direction of both portions of the divided beam and directs each to photodetectors for comparison.

A further object of the invention is the provision of a system of nested double cuvettes and an optical system which are rotatable with respect to each other, so that rapid and sequential examinations can be made of a relatively large number of specimens.

A further object of the invention is the provision of a compact device by means of which a beam of light is optically filtered, divided and directed in parallel paths rapidly and sequentially through a series of double cuvettes, each double unit containing (1) a standard specimen, and (2) an unknown, then directed as parallel beams, at a 90° angle, then redirected once more 90°, bringing them parallel to their original divided paths and in a reverse direction and thence to a pair of photoelectric cells. The redirection of the beams along parallel but reversed paths allows compacting of the device and making it portable.

The present invention is an improvement and simplification of a co-pending application filed by me on Aug. 9, 1965, Ser. No. 478,495. In the device of this co-pending application, beams from a single light source are directed at right angles to each other. Two simultaneously rotating systems are required. Each system is provided with a holder upon which are mounted a series of single cuvettes. One system contains standard specimens, the other the unknowns which are being examined. In the present device the standard specimen and the unknowns are contained in a nested double cuvette through which a divided beam follows parallel paths to photo cells for comparison.

These and other advantages, features and objects of the invention will become more apparent from the following description taken in connection with the illustrative embodiments in the accompanying drawings, wherein:

FIGURE 1 is a cross section of a schematic showing of the device;

FIGURE 2 is a top plan view of the double cuvette looking downward into the inlet-outlet ends of the two tubes;

FIGURE 3 is a cross section taken substantially on the line 3—3 of FIGURE 2;

FIGURE 4 is a vertical cross section taken substantially on the line 4—4 of FIGURE 1; and FIGURE 5 is a horizontal cross section taken substantially on the line 5—5 of FIGURE 1.

Referring more in detail to the drawing, the optical system indicated generally by the numeral 10 is mounted in a frame or any supporting structure 12 provided with suitable bearings 13, and is rotated by some means such as a motor, indicated schematically at 15. A light source 14 is located in a lamp housing 16. The housing 16 is provided with a light slit 18, and rotates with the prism system, so that a beam passing through the slit 18 is continuously picked up by the first prism 36 of the prism system. A circular drum or housing 19 has a central opening which provides space for the lamp 14 and housing 16. The drum 19 is stationary in the preferred embodiment shown, and supports optical equipment and the specimens to be examined. Nested cuvette units 22 are mounted on a cuvette holder or disk 20 located in the drum 19. In comparison to the laborious examination of single specimens, one by one, a relatively large number of cuvette units 22 can be mounted on the holder 20. Each double cuvette is comprised of a pair of U-shaped tubes 24 and 26. The tubes 24 and 26 are provided with inlet-outlet portions 24' and 26', respectively. An optical filter 28 selects the wave length of the beam and a pair of adjustable iris diaphragms 30 divides it. The double cuvettes are so arranged that the base portions of the two tubes are substantially parallel. For convenience, the divided portions of the beam are indicated A and B. The portion of the divided beam enters the base portion of the tube 24, traveling a maximum distance through the sample contained therein, and the B portion of the beam in like manner travels a maximum distance through the base portion of the tube 26. One of the tubes 24 or 26 contains a standard specimen, the other the specimen under examination.

The optical system comprises a prism frame 34 mounted to rotate on a base 12. A single prism or mirror 36 is arranged to intercept both beams emanating from the nested cuvette tubes 24 and 26 at an angle of 45° and redirect them 90° as shown in FIGURE 1, to be again intercepted by a prism or mirror 38 which again directs both beams in a reverse direction along the lower paths B' and A' where they are finally intercepted by photodetector rings 44 and 46. The photodetectors 44 and 46 are shown schematically and include standard meter or comparison means for comparing the liquid samples in the pairs of cuvettes. In practice one of the pair contains a standard specimen with which an unknown is compared.

It will now be seen that the rotating optical system makes it possible to direct a pair of beams through one cuvette unit after another in rapid succession. The number of pairs of cuvettes are limited only by the physical dimensions of the system and the intensity of the light.

In the description of the invention just given, the cuvette disks are stationary and the optical system is mounted to rotate. It is obvious, however, that the importance lies in the relative rotation of these two elements or systems. Either element may be made rotatable.

Although the invention has been described with reference to a particular embodiment, it will be understood to those skilled in the art that the invention is capable of a variety of alternative embodiments within the spirit and scope of the appended claim.

I claim:

1. In a device for performing optical analyses, a cuvette holder, a plurality of cuvette units mounted on said cuvette holder in circular formation, each cuvette unit comprising first and second nested cuvette tubes having parallel base portions adapted to receive parallel beams of light, a light source located at the center of said circular cuvette formation, lens and filter means for rendering first and second light beams from said light source parallel and identical, and being so positioned to direct said first light beam through the base portion of said first nested cuvette tube and said second light beam through the base portion of said second nested cuvette tube, a reflector system, said reflector system and said light source having relative rotating movement with respect to said cuvette holder, the light source being located at the center of a circle of which the reflector system forms a circumference, said reflector system comprising a first prism and a second prism, said first prism located to intercept said first and second parallel beams at a 45° angle and redirect them, still parallel, 90°, said second prism being located to intercept said redirected beams at a second 45° angle and again redirect them 90°, said beams still proceeding in parallel relationship and in paths parallel to their original paths but in a reverse direction, and first and second photosensitive systems, each placed to receive one of said redirected beams, for measuring the light transmitted through said first and second nested cuvette tubes.

References Cited

UNITED STATES PATENTS

| Re. 18,005 | 3/1931 | Darrah. | |
| 2,118,837 | 5/1938 | Felton. | |
| 2,253,581 | 8/1941 | Reynolds | 230—218 |
| 2,483,875 | 10/1949 | Boyer | 230—218 X |
| 2,802,391 | 8/1957 | Maier | 356—185 |
| 3,031,917 | 5/1962 | Pelavin | 230—211 X |
| 3,241,432 | 3/1966 | Skeggs et al. | |
| 3,314,327 | 4/1967 | Killpatrick et al. | |
| 3,340,764 | 9/1967 | Bergson. | |

FOREIGN PATENTS 502,971    3/1939    Great Britain.

OTHER REFERENCES

IBM Tech. Disc. Bull., vol. 4, No. 1, June 1961, p. 68.

RONALD L. WIBERT, Primary Examiner

W. A. SKLAR, Assistant Examiner

U.S. Cl. X.R.

250—226; 356—188, 195